United States Patent
Telefus et al.

(10) Patent No.: US 10,917,001 B2
(45) Date of Patent: Feb. 9, 2021

(54) ADAPTIVE RESONANT FREQUENCY CONVERTER

(71) Applicant: Flex Ltd., Singapore (SG)

(72) Inventors: Mark Telefus, Orinda, CA (US); Nate Vince, San Jose, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/105,330

(22) Filed: Aug. 20, 2018

(65) Prior Publication Data

US 2019/0058389 A1 Feb. 21, 2019

Related U.S. Application Data

(60) Provisional application No. 62/548,318, filed on Aug. 21, 2017.

(51) Int. Cl.
 *H02M 1/08* (2006.01)
 *H02M 7/537* (2006.01)
 (Continued)

(52) U.S. Cl.
 CPC .............. *H02M 1/083* (2013.01); *H02M 1/36* (2013.01); *H02M 3/335* (2013.01); *H02M 7/537* (2013.01);
 (Continued)

(58) Field of Classification Search
 CPC ........ H02M 1/083; H02M 1/36; H02M 3/335; H02M 7/537; H02M 2001/0058; H02M 2007/4815
 (Continued)

(56) References Cited

U.S. PATENT DOCUMENTS

| 3,461,372 A | * | 8/1969 | Barton | ................... | H02M 7/537 |
| | | | | | 327/129 |
| 4,788,634 A | * | 11/1988 | Schlecht | ........... | H02M 3/33538 |
| | | | | | 323/266 |

(Continued)

FOREIGN PATENT DOCUMENTS

| EP | 3447890 A1 | 2/2019 |
| EP | 3447895 A1 | 2/2019 |
| WO | WO2017001184 A1 | 1/2017 |

OTHER PUBLICATIONS

Received STIC search report from EIC 2800 searcher John DiGeronimo dated Oct. 23, 2018. (Year: 2018).*

(Continued)

*Primary Examiner* — Shawki S Ismail
*Assistant Examiner* — Htet Z Kyaw
(74) *Attorney, Agent, or Firm* — Haverstock & Owens LLP

(57) ABSTRACT

A resonant power converter has a main switch, a resonant tank coupled across the main switch, and a signal processing circuit coupled to the main switch and the resonant tank. The signal processing circuit generates a driving signal for driving the main switch ON and OFF at a switching frequency. The resonant tank includes circuit components designed to have a resonant frequency that is tuned to a designed switching frequency of the main switch. The signal processing circuit includes a zero voltage switching (ZVS) circuit, a signal generator, a detection circuit, and a latch oscillator. The signal processing circuit is configured to adjust the switching frequency of the driving signal to be tuned to the actual resonant frequency of a resonant tank under very high switching frequency conditions, 1 MHz and (Continued)

greater, thereby accounting for the influence of parasitics at very high switching frequencies and achieving resonance of the circuit.

14 Claims, 3 Drawing Sheets

(51) Int. Cl.
  *H02M 1/36* (2007.01)
  *H02M 3/335* (2006.01)
  *H02M 1/00* (2006.01)
  *H02M 7/48* (2007.01)
(52) U.S. Cl.
  CPC ............... *H02M 2001/0058* (2013.01); *H02M 2007/4815* (2013.01)
(58) Field of Classification Search
  USPC ............ 363/131, 21.02, 21.03, 21.12, 21.13, 363/21.15, 21.17, 173, 165, 171, 18, 15
  See application file for complete search history.

(56) References Cited

U.S. PATENT DOCUMENTS

| | | | | |
|---|---|---|---|---|
| 5,438,498 | A * | 8/1995 | Ingemi | H02M 3/3376 363/132 |
| 7,742,318 | B2 * | 6/2010 | Fu | H02M 3/33592 363/16 |
| 8,867,237 | B2 * | 10/2014 | Desimone | H02M 1/44 363/21.05 |
| 9,178,438 | B2 * | 11/2015 | Fu | H02M 3/33576 |
| 9,660,544 | B1 | 5/2017 | Telefus et al. | |
| 9,697,947 | B1 | 7/2017 | Luzanov | |
| 9,812,974 | B2 * | 11/2017 | Imai | H02M 3/33546 |
| 9,893,627 | B1 | 2/2018 | Telefus et al. | |
| 9,893,647 | B2 * | 2/2018 | Imai | H02M 7/537 |
| 9,941,799 | B1 | 4/2018 | Telefus et al. | |
| 9,979,306 | B1 | 5/2018 | Xu et al. | |
| 10,186,985 | B1 * | 1/2019 | Tao | H02M 7/4826 |
| 10,511,321 | B2 | 12/2019 | Telefus et al. | |
| 2005/0099827 | A1 | 5/2005 | Sase et al. | |
| 2007/0058406 | A1 | 3/2007 | Inoshita | |
| 2007/0171680 | A1 * | 7/2007 | Perreault | H02M 1/34 363/16 |
| 2007/0236967 | A1 | 11/2007 | Liu et al. | |
| 2007/0263415 | A1 | 11/2007 | Jansen | |
| 2013/0093528 | A1 | 4/2013 | Kuehner | |
| 2015/0155669 | A1 | 6/2015 | Chamberlain | |
| 2016/0322968 | A1 | 11/2016 | Mao et al. | |
| 2016/0352234 | A1 | 12/2016 | Imai | |
| 2016/0352235 | A1 | 12/2016 | Imai | |
| 2017/0063411 | A1 * | 3/2017 | Ripley | H04B 1/1036 |
| 2017/0117819 | A1 * | 4/2017 | Chen | H02M 7/217 |
| 2018/0164355 | A1 | 6/2018 | Winkler | |
| 2018/0294742 | A1 | 10/2018 | Qiu | |
| 2019/0089254 | A1 * | 3/2019 | Op Het Veld | H02M 1/08 |

OTHER PUBLICATIONS

"Transfer Synthesis for VHF Converters", Anthony D. Sagneri, David I Anderson, David J. Perreault, Laboratory for Electromagnetic and Electronic Systems, Massachusetts Institute of Technology, Room 10-171, Cambridge, Massachusetts 02139. National Semiconductor Corporation, 2900 Semiconductor Drive, Santa Clara, CA 95052-8090, 7 pages.

European Office Action dated Oct. 7, 2019, European Patent Application No. 18 189 747.1, applicant Flex Ltd., 8 pages.

First action dated Apr. 29, 2020, Chinese Patent Application No. 2018108146828, Applicant: Flextronics AP, LLC., 23 pages.

* cited by examiner

ADAPTIVE RESONANT FREQUENCY CONVERTER

RELATED APPLICATIONS

This Patent Application claims priority under 35 U.S.C. 119(e) of the U.S. provisional patent applications, Application Ser. No. 62/548,318, filed on Aug. 21, 2017, and entitled "Adaptive Resonant Frequency Converter", which is hereby incorporated in its entirety by reference.

FIELD OF THE INVENTION

The present invention is generally directed to the field of power converters. More specifically, the present invention is directed to a resonant power converter used for power management and power supply.

BACKGROUND OF THE INVENTION

There are several power converter topologies that have been developed over the years, which are intended to improve the power density and switching efficiency of power converters. An emerging focus of new converter topologies is to provide a means to reduce or eliminate converter switching losses, while increasing the switching frequencies. Lower loss and higher switching frequency means more efficient converters, which can reduce the size and weight of converter components. Additionally, with the introduction of high speed composite semiconductor switches, such as metal oxide semiconductor field effect transistor (MOSFET) switches operated by pulse width modulation (PWM), recent forward and flyback topologies are now capable of operation at greatly increased switching frequencies, such as, for example, up to and greater than 1 MHz.

However, an increase in switching frequency can cause a corresponding increase in switching and component stress related losses, as well as increased electromagnetic interference (EMI), noise, and switching commutation problems, due to the rapid ON/OFF switching of the semiconductor switches at high voltage and/or high current levels. Moreover, modern electronic components are expected to perform multiple functions, in a small space, efficiently, and with few undesirable side effects. For instance, a modern voltage converter that provides for relatively high power density and high switching frequencies, should also include uncluttered circuit topologies, provide for isolation of the output or "load" voltage from the input or "source" voltage, and also provide for variable step-up or step-down voltage transformation.

A drawback to many of the conventional power converter circuits is the relatively high voltage and current stress suffered by the switching components. Additionally, high turn-off voltage (caused by the parasitic oscillation between transformer leakage inductance and switch capacitance) seen by the primary switch traditionally requires the use of a resistor, capacitor, diode subcircuit, such as a snubber circuit. This parasitic oscillation is extremely rich in harmonics and pollutes the environment with EMI, and causes high switching losses from the switching components in the form of extra thermal dissipation.

In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. Resonant switching techniques generally include an inductor-capacitor (LC) subcircuit in series with a semiconductor switch which, when turned ON, creates a resonating subcircuit within the converter. Further, timing the ON/OFF control cycles of the resonant switch to correspond with particular voltage and current conditions across respective converter components during the switching cycle allows for switching under zero voltage and/or zero current conditions. Zero voltage switching (ZVS) and/or zero current switching (ZCS) inherently reduces or eliminates many frequency related switching losses.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic. In the field of applying resonant power converters for power management and power supply, a critical task is to eliminate losses and maintain high efficiency over a wide input voltage range. To achieve performance efficiency and well defined control for regulation as designed, the resonant tank is tuned to the switching frequency of the main switch of the resonant power converter. Tuning the resonant tank in this manner enables the resonant power converter to operate in resonance. Such resonant power converters can be operated with switching frequencies reaching the KHz range while still maintaining resonance between the resonant frequency and the switching frequency. However, resonant power converters are moving toward applications that use very high frequency switching, 1 MHz and greater. In such very high frequency applications, the parasitics of the various circuit components, such as the ESL (equivalent series inductance) of capacitors, leakage inductance, and the capacitive and inductive nature of the transistor switches, is no longer negligible as it relates to resonance. The resonant frequency is a function of the capacitor and inductor values in the resonant tank, as well as the parasitics in the circuit. Due to the parasitics, the resonant frequency at very high switching frequencies is altered from the designed resonant frequency tuned to the intended operational switching frequency. As such, the altered resonant frequency is no longer tuned to the switching frequency at very high switching frequencies, resulting in diminished performance efficiency and control.

SUMMARY OF THE INVENTION

Embodiments are directed to a resonant power converter having a main switch, a resonant tank coupled across the main switch, and a signal processing circuit coupled to the main switch and the resonant tank. The signal processing circuit generates a driving signal for driving the main switch ON and OFF at a switching frequency. The resonant tank includes circuit components, such an inductor and a capacitor, that are designed to have a resonant frequency that is tuned to a designed switching frequency of the main switch. The signal processing circuit includes a zero voltage switching (ZVS) circuit, a signal generator, a detection circuit, and a latch oscillator. The signal processing circuit is configured to adjust the switching frequency of the driving signal to be tuned to the actual resonant frequency of a resonant tank under very high switching frequency conditions, 1 MHz and greater, thereby accounting for the influence of parasitics at very high switching frequencies and achieving resonance of the circuit.

In an aspect, a resonant power converter is disclosed that includes a transformer, a switch, a resonant tank, and a signal processing circuit. The transformer has a primary winding and a secondary winding, wherein the secondary winding is coupled to an output of the resonant power converter. The switch is coupled in series to the primary winding. The resonant tank is coupled in parallel across the switch. The signal processing circuit is coupled to the resonant tank and to the switch. The signal processing circuit is configured to generate a driving signal having a switching frequency to drive the switch, to sense a voltage across the resonant tank, and to selectively adapt the switching frequency according to the sensed voltage across the resonant tank so that the switching frequency is tuned to the resonant frequency of the resonant tank. In some embodiments, the primary winding is coupled to an input voltage supply. In some embodiments, the switch is a transistor switch. In some embodiments, the transistor switch is a metal-oxide-semiconductor field-effect transistor (MOSFET), and the first terminal of the switch is a drain of the MOSFET. In some embodiments, the resonant tank comprises an inductor coupled in series with a capacitor. In some embodiments, adapting the switching frequency to be in tune with the resonant frequency configures the resonant power converter to operate in resonance. In some embodiments, operating in resonance generates a camelback voltage waveform across the resonant tank, wherein a first peak of the camelback voltage waveform corresponds to a fundamental frequency of the switching frequency, a notch in the camelback voltage waveform corresponds to a second harmonic of the switching frequency, and a second peak in the camelback voltage waveform corresponds to a third harmonic of the switching frequency. In some embodiments, the resonant tank includes circuit components selected to have the resonant frequency be a designed resonant frequency that is tuned to a designed switching frequency. In some embodiments, the switching frequency is greater than or equal to 1 MHz, further wherein at switching frequencies greater than or equal to 1 MHz, the resonant frequency is altered to an altered resonant frequency different than the designed resonant frequency due to parasitics in the switch at the switching frequency greater than or equal to 1 MHz, and the signal processing circuit selectively adapts the switching frequency to an adapted switching frequency different than the designed switching frequency to tune the adapted switching frequency to the altered resonant frequency. In some embodiments, the resonant tank is tuned to filter out a second harmonic of the designed switching frequency. In some embodiments, the adapted switching frequency is adapted such that the resonant tank with altered resonance frequency filters out a second harmonic of the adapted switching frequency. In some embodiments, the circuit components of the resonant tank comprise an inductor and a capacitor coupled in series.

In some embodiments, the signal processing circuit comprises a zero voltage switching circuit coupled to the switch to sense a voltage across the switch and to generate a signal to turn ON and OFF the switch upon detecting a zero voltage crossing. In some embodiments, the signal processing circuit comprises a detection circuit to sense the voltage across the resonant tank, to compare a waveform of the sensed voltage to a voltage profile, and to output a modulation signal according to the comparison. In some embodiments, the detection circuit is configured to detect peak and notch voltages within the sensed voltage waveform and to compare the detected peak and notch voltages to threshold values. In some embodiments, the signal processing circuit further comprises a signal generator coupled to the detection circuit, wherein the signal generator generates a signal having a switching frequency modulated by the modulation signal output from the detection circuit. In some embodiments, the signal processing circuit comprises a latch oscillator to latch the adapted frequency when the adapted switching frequency is tuned to an altered resonant frequency of the resonant tank.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
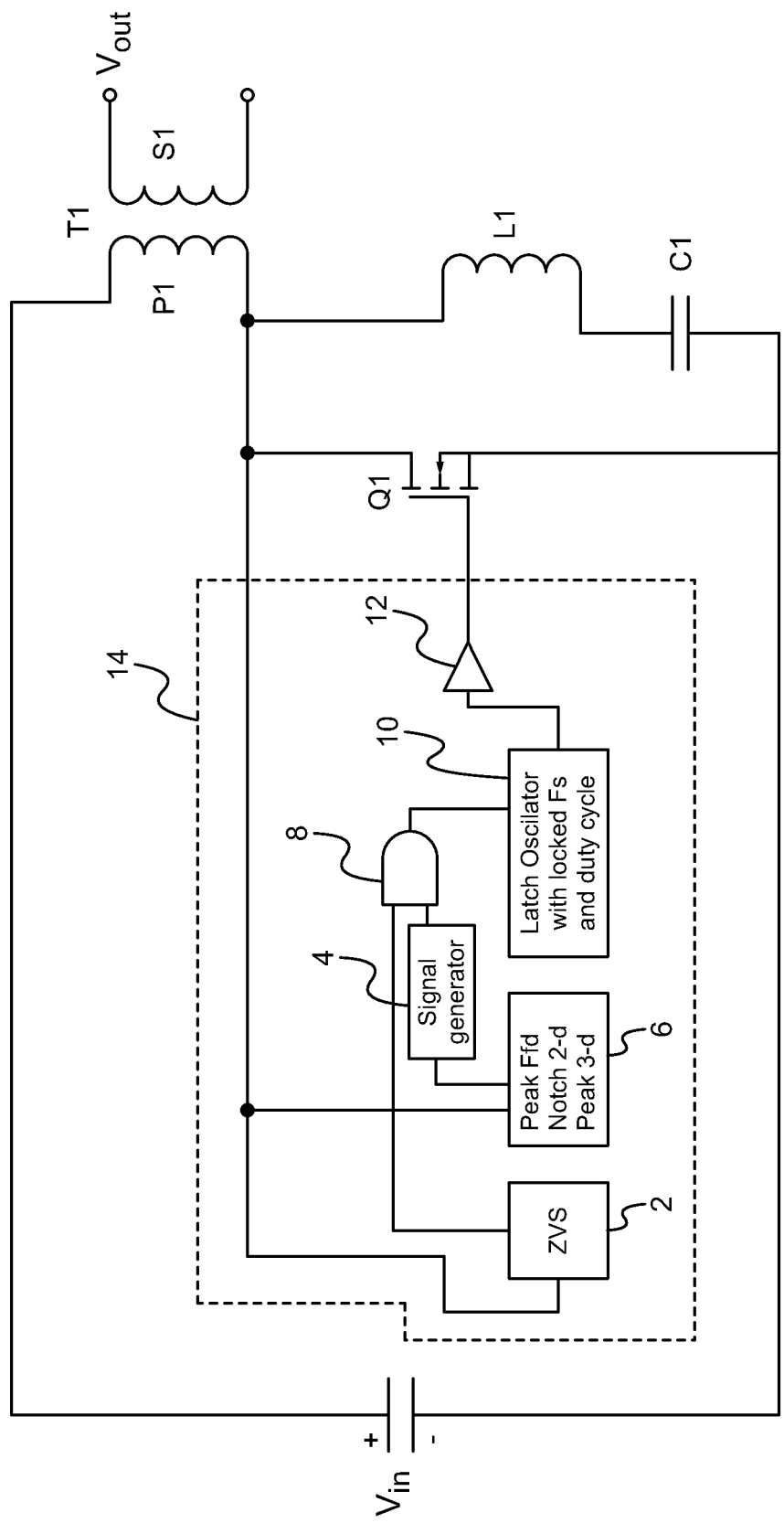
FIG. 1 illustrates a schematic circuit diagram of a resonant power converter according to some embodiments.

Embodiments of the present application are directed to a resonant power converter. Those of ordinary skill in the art will realize that the following detailed description of the resonant power converter is illustrative only and is not intended to be in any way limiting. Other embodiments of the resonant power converter will readily suggest themselves to such skilled persons having the benefit of this disclosure.

Reference will now be made in detail to implementations of the resonant power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments are directed to a resonant power converter having a main switch, a resonant tank coupled across the main switch, and a signal processing circuit coupled to the main switch and the resonant tank. The signal processing circuit generates a driving signal for driving the main switch ON and OFF at a switching frequency. The resonant tank includes circuit components, such an inductor and a capacitor, that are designed to have a resonant frequency that is tuned to a designed switching frequency of the main switch. The signal processing circuit includes a zero voltage switching (ZVS) circuit, a signal generator, a detection circuit, and a latch oscillator.

At lower switching frequencies, such as the KHz range, the resonant power converter operates in resonance simply using the ZVS circuit and generating a driving signal that corresponds to the designed switching frequency. In this case, the resonant frequency of the resonant tank matches the designed resonant frequency tank, where the deigned resonant frequency is accomplished through designed values of the resonant tank components tuned to the designed switching frequency. There are parasitic capacitances across the main switch, for example a parasitic capacitance across the drain and source of a MOSFET, another parasitic capacitance across the gate and source, and another parasitic capacitance across the drain and gate. Across the MOSFET there is also a parasitic inductance. There are also parasitics associated with other circuit elements of the resonant power converter. The parasitics present at lower switching frequencies do not substantially change the actual resonant frequency from the designed resonant frequency and therefore the circuit remains in resonance.

At the very high frequencies however, such as 1 MHz and greater, the parasitics are more impactful and alter the resonant frequency. The actual resonant frequency is different enough than the designed resonant frequency, and the switching frequency generated by the ZVS circuit and the resonant frequency of the resonant tank are no longer in resonance. This leads to reduced performance efficiency and circuit predictability than as originally designed. The original circuit design cannot calculate a proper inductance and capacitance for the resonant tank circuit elements to achieve a resonant tank that accounts for all the parasitics at the very high switching frequencies.

The signal processing circuit is configured to adjust the switching frequency of the driving signal to be tuned to the actual resonant frequency of a resonant tank under very high switching frequency conditions, 1 MHz and greater, thereby accounting for the influence of parasitics at very high switching frequencies and achieving resonance of the circuit. In other words, the resonant power converter enables tuning of the switching frequency to the resonant frequency altered by the parasitics present at very high switching frequencies. In particular, the switching frequency is tuned so that the second harmonic of the altered resonant frequency is filtered out. Operating in resonance also reduces the voltage stress across the transistor switch Q1 by filtering out the peak voltage caused by the second harmonic.

FIG. 1 illustrates a schematic circuit diagram of a resonant power converter according to some embodiments. The resonant power converter includes a transformer T1, a transistor switch Q1, a signal processing circuit 14, and a resonant tank. The resonant tank includes an inductor L1 and a capacitor C1. The signal processing circuit 14 includes a ZVS circuit 2, a signal generator 4, a detection circuit 6, an AND gate 8, a latch oscillator 10, and an amplifier 12. The transformer T1 includes a primary winding P1 and a secondary winding S2. The secondary winding voltage can be rectified and filtered, such as by using a diode (not shown) and a capacitor (not shown), which is provided as an output voltage Vout. In some embodiments, the resonant power converter is configured as a flyback converter. It is understood that the resonant power converter can be alternatively configured according to other conventional converter schemes. In some embodiments, the transistor switch Q1 is a metal-oxide-semiconductor field-effect transistors (MOSFETs). In the exemplary configuration shown in FIG. 1, the transistor switch Q1 is an n-channel MOSFET. Alternatively, other types of semiconductor transistors can be used.

A first terminal of the primary winding P1 is coupled to the positive terminal of the input voltage supply Vin. A second terminal of the primary winding P1 is coupled to a drain of the transistor switch Q1 and to a first terminal of the inductor L2. A source of the transistor switch Q1 is coupled to ground. A second terminal of the inductor L1 is coupled to a first terminal of the capacitor C1. A second terminal of the capacitor C1 is coupled to ground. The second terminal of the primary winding P1 is also coupled as input to the ZVS circuit 2 and the detection circuit 6. A first output of the ZVS circuit 2 is coupled as a first input to the AND gate 8, and an output of the detection circuit 6 is coupled as input to the signal generator 4. An output of the signal generator 4 is coupled as a second input to the AND gate 8. An output of the AND gate 8 is coupled as input to the latch oscillator 10. An output of the latch oscillator 10 is coupled as input the amplifier 12. An output of the amplifier 12 is a drive signal coupled as input to a gate of the transistor switch Q1. It is understood that the functional blocks shown in FIG. 1 are for exemplary purposes and that one or more of the functional blocks can be combined and/or further subdivided, or that additional functional blocks can be added to accomplish the functionality of the resonant power converter described herein.

Figure 2:
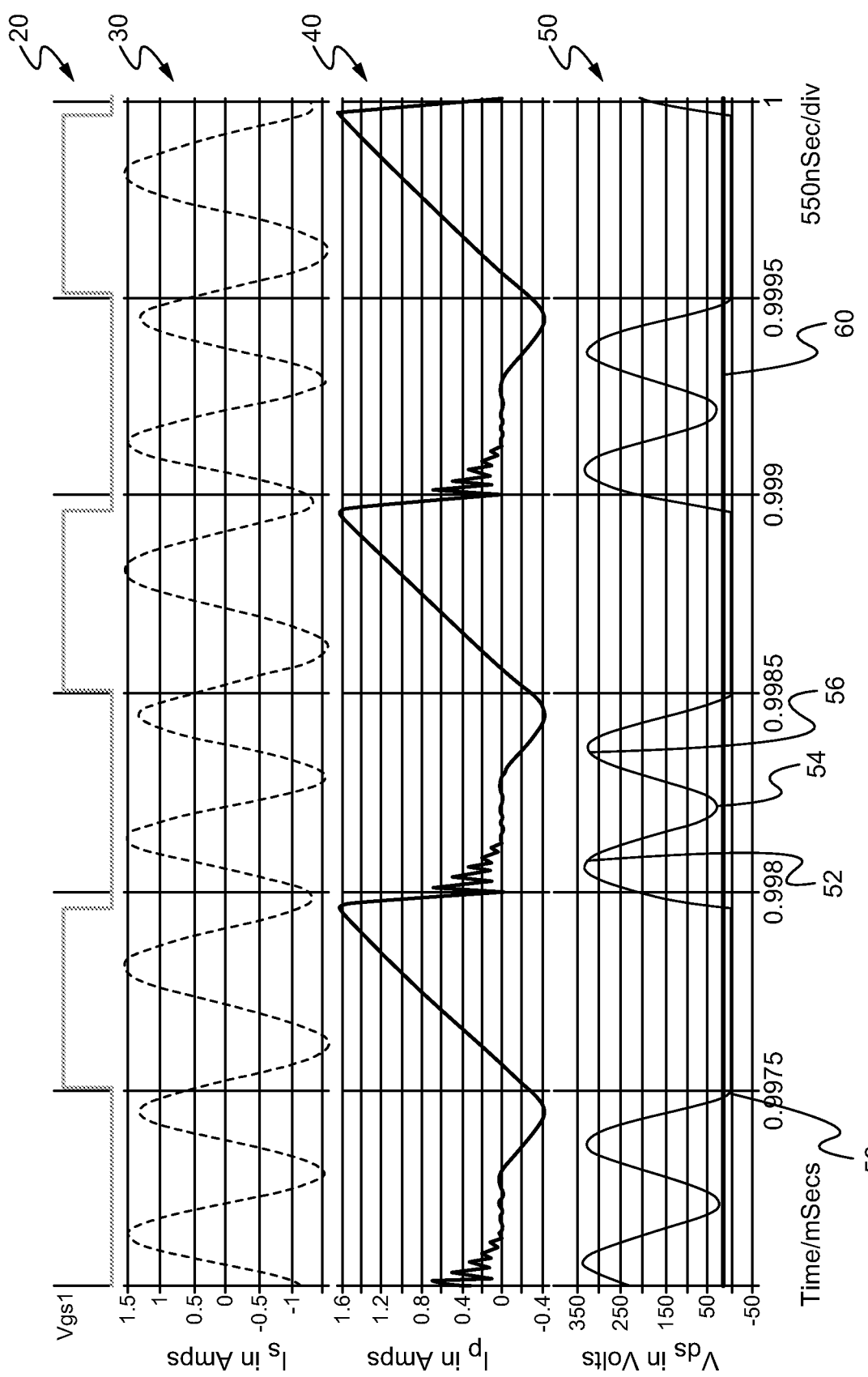
FIG. 2 illustrates exemplary waveforms corresponding to operation of the resonant power converter.

FIG. 2 illustrates exemplary waveforms corresponding to operation of the resonant power converter. The waveforms shown in FIG. 2 are described in relation to the resonant power converter of FIG. 1 operating in resonance. The waveform 20 is an exemplary driving signal applied to the gate of the transistor switch Q1, which is represented as the gate-to-source voltage Vgs. In some embodiments, the driving signal is a pulse width modulated signal having a defined frequency, which corresponds to the switching frequency of the transistor switch Q1, and duty cycle. The waveform 30 is an exemplary current through the secondary winding S1, which is represented as secondary current Is. The waveform 40 is an exemplary current through the primary winding P1, which is represented as primary current Ip. The waveform 50 is an exemplary voltage across the transistor switch Q1, which is represented as drain-to-source voltage Vds. The shape of waveform 40 is referred to as a camelback waveform having two peaks, or humps. The drain-to-source voltage Vds is also the voltage across the resonant tank formed by the inductor L1 and the capacitor C1, as shown in FIG. 1. The waveform 60 is an exemplary output voltage Vout.

When the transistor switch Q1 is turned ON, corresponding to the gate-to-source voltage Vgs going high in waveform 20, the primary current Ip begins to rise linearly. The primary current Ip peaks at the point when the transistor switch Q1 is turned OFF, corresponding to the gate-to-source voltage Vgs going low.

When the transistor is OFF (driving signal low) and the circuit is in resonance, the switching frequency tuned to the resonant frequency, the drain-to-source voltage Vds forms the camelback waveform shown in waveform 50. The camelback waveform has a first peak 52 which corresponds to the fundamental switching frequency, the notch 54 corresponds to the second harmonic, and the second peak 54 corresponds to the third harmonic. The inductance of the inductor L1 and the capacitance of the capacitor C1 are originally designed to filter the second harmonic of the designed switching frequency, where the notch 54 results from filtering the second harmonic at resonance. In other words, the camelback waveform is formed by filtering out the second harmonic. The resonant tank functions as a second harmonic filter, and as such is tuned to double the switching frequency. For example, if the resonant power converter is designed to operate at a switching frequency of 1 MHz, then the resonant tank components L1 and C1 are designed to have a resonant frequency of 2 MHz, which functions as a second harmonic filter at 2 MHz. However, operating at this very high switching frequency (1 MHz) introduces parasitics that alter the resonant frequency (2 MHz) of the filter (resonant tank) enough that the altered resonant frequency (different than 2 MHz) is no longer tuned to the designed switching frequency (1 MHz) to filter out the second harmonic as designed. As such, the switching frequency is adjusted to be in tune with the altered resonant frequency, establishing circuit resonance and proper second harmonic filtering.

Figure 3:
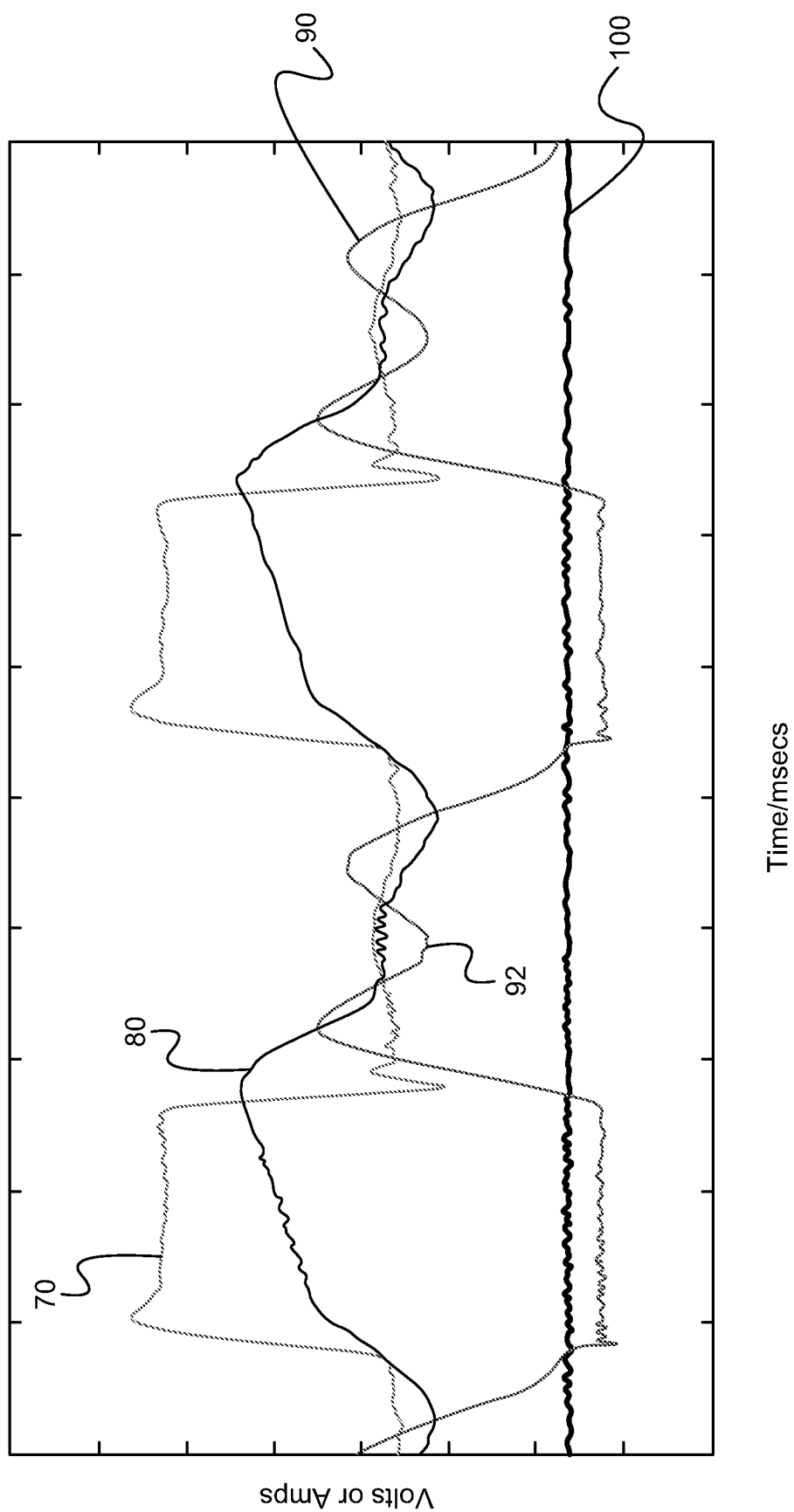
FIG. 3 illustrates exemplary waveforms corresponding to simulated operation of the resonant power converter.

The waveforms shown in FIG. 2 show theoretical waveforms. In theory, the notch 54 drops to substantially 0 V. In practice, the notch in the drain-to-source voltage Vds does not drop to zero volts, but to some mid-level value such as the notch 92 shown in the simulated drain-to-source voltage Vds waveform 90 in FIG. 3. FIG. 3 illustrates exemplary waveforms corresponding to simulated operation of the resonant power converter. The waveform 70 represent a simulated driving signal. The waveform 80 shows a simulated primary current Ip. The waveform 100 shows a simulated output voltage Vout.

Zero voltage switching is implemented by the ZVS circuit 2. The ZVS circuit 2 senses the drain-to-source voltage Vds and determines zero crossing points, such as point 58 on waveform 50, of the drain-to-source voltage Vds for triggering the transistor switch to turn ON.

When the resonant power converter is initially powered on, referred to as power-up, the driving signal is generated having the designed switching frequency. The switching frequency is then adapted to be tuned to the resonant frequency altered by parasitics. Power-up is a process that includes multiple cycles. During the power-up phase, all the parasitics must present themselves to be adaptively compensated for in the adjusted switching frequency. Initially at power-up, the designed switching frequency of the signal output from the signal generator is not tuned to the resonant frequency due to the parasitics, and a feedback voltage is used to modulate the switching frequency of the signal output from the sweep generator. The signal generated by the signal generator 4 is adjusted so that the switching frequency is tuned to the altered resonant frequency of the resonant tank. Adjusting the switching frequency to be tuned to the resonant frequency is an iterative process that may take multiple cycles. Once tuned, the tuned signal is latched by the latch oscillator to lock in the tuned switching frequency and duty cycle. Application of the tuned switching frequency results in the camelback voltage waveform across the transistor switch Q1 and the resonant tank.

To adapt the switching frequency, the drain-to-source voltage Vds, which is also the voltage across the resonant tank L1, C1, is sensed by the detection circuit 6 and compared to a desired voltage profile, such as the camelback voltage waveform shown in waveform 50 or 90. If the circuit is in resonance, the sensed drain-to-source voltage Vds will match the desired voltage profile. An example technique for comparing includes, but is not limited to, sensing peaks and notches within the sensed drain-to-source voltage Vds and comparing those sensed values to known threshold values or ranges. The result of the comparison is used to modulate the signal generated by the signal generator 4. For example, the comparison result is used to increase or decrease the switching frequency of the signal generated by the signal generator 4 according to a size and sign of the comparison result. It is understood that other techniques can be used to adjust the switching frequency according to the sensed drain-to-source voltage Vds.

During power-up, the peaks and notches in the sensed drain-to-source voltage Vds waveform will vary from cycle to cycle as the switching frequency is being adjusted. Once the power-up phase is completed, which corresponds to all parasitics being presented and the switching frequency being properly adapted to be tuned to the altered resonant frequency, the peaks and notches of the camelback voltage waveform will be more or less stable because the adjusted switching frequency is locked in by the latch oscillator.

After power-up, the switching frequency can continue to be adjusted to compensate for changing resonant frequency due to changing circuit conditions. For example, changing line voltage (Vin) conditions, such as input voltage ranging from 90 Vrms to 270 Vrms, or changing load conditions, such as current ranging from 1 A to 10 A, also alters the resonant frequency. So a changing line voltage or load can also be compensated for using this circuit and technique to adjust the switching frequency to be in tune with the altered resonant frequency due to the changing conditions.

The present application has been described in terms of specific embodiments incorporating details to facilitate the understanding of the principles of construction and operation of the resonant power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A resonant power converter comprising:
a. a transformer having a primary winding and a secondary winding, wherein the secondary winding is coupled to an output of the resonant power converter;
b. a switch coupled in series to the primary winding;
c. a resonant tank coupled in parallel across the switch; and
d. a signal processing circuit coupled to the resonant tank and to the switch, wherein the signal processing circuit is configured to generate a driving signal having a switching frequency to drive the switch, wherein the resonant tank includes circuit components selected to result in a designed resonant tank resonant frequency tuned to a designed switching frequency of the switch that is less than 1 MHz, wherein when the switch is operated at a first switching frequency less than 1 MHz a first resonant tank resonant frequency is in resonance with the first switching frequency of the switch in accordance with the tuned circuit components of the resonant tank, further wherein when the switch is operated at a second switching frequency greater than or equal to 1 MHz a second resonant tank resonant frequency is formed that is different than the first resonant tank resonant frequency due to parasitics in the switch and the transformer at the second switching frequency greater than or equal to 1 MHz, and the second resonant tank resonant frequency is out of tune with the second switching frequency of the switch, wherein the signal processing circuit is further configured to sense a voltage across the resonant tank, to compare a waveform of the sensed voltage to a voltage profile, and to selectively adapt the second switching frequency of the switch to an adapted switching frequency different than the second switching frequency according to the comparison, wherein the adapted switching frequency is tuned to be in resonance with the second resonant tank resonant frequency.

2. The resonant power converter of claim 1 wherein the primary winding is coupled to an input voltage supply.

3. The resonant power converter of claim 1 wherein the switch is a transistor switch.

4. The resonant power converter of claim 3 wherein the transistor switch is a metal-oxide-semiconductor field-effect transistor (MOSFET), and the first terminal of the switch is a drain of the MOSFET.

5. The resonant power converter of claim 1 wherein adapting the second switching frequency to be in tune with the second resonant tank resonant frequency configures the resonant power converter to operate in resonance.

6. The resonant power converter of claim 5 wherein operating in resonance generates a camelback voltage waveform across the resonant tank, wherein a first peak of the camelback voltage waveform corresponds to a fundamental frequency of the switching frequency, a notch in the camelback voltage waveform corresponds to a second harmonic of the switching frequency, and a second peak in the camelback voltage waveform corresponds to a third harmonic of the switching frequency.

7. The resonant power converter of claim 1 wherein the resonant tank is tuned to filter out a second harmonic of the designed switching frequency.

8. The resonant power converter of claim 7 wherein the adapted switching frequency is adapted such that the resonant tank with second resonant tank resonant frequency filters out a second harmonic of the second switching frequency.

9. The resonant power converter of claim 1 wherein the circuit components of the resonant tank comprise an inductor and a capacitor coupled in series.

10. The resonant power converter of claim 1 wherein the signal processing circuit comprises a zero voltage switching circuit coupled to the switch to sense the voltage across the switch and to generate a signal to turn ON and OFF the switch upon detecting a zero voltage crossing.

11. The resonant power converter of claim 1 wherein the signal processing circuit comprises a detection circuit to sense the voltage across the resonant tank, to compare the waveform of the sensed voltage to a voltage profile, and to output a modulation signal according to the comparison.

12. The resonant power converter of claim 11 wherein the detection circuit is configured to detect peak and notch voltages within the sensed voltage waveform and to compare the detected peak and notch voltages to threshold values.

13. The resonant power converter of claim 11 wherein the signal processing circuit further comprises a signal generator coupled to the detection circuit, wherein the signal generator generates a signal having a switching frequency modulated by the modulation signal output from the detection circuit to have the adapted switching frequency.

14. The resonant power converter of claim 1 wherein the signal processing circuit comprises a latch oscillator to latch the adapted switching frequency when the adapted switching frequency is tuned to the second resonant tank resonant frequency of the resonant tank.

\* \* \* \* \*